US009241594B2

(12) United States Patent
Rodriguez et al.

(10) Patent No.: US 9,241,594 B2
(45) Date of Patent: Jan. 26, 2016

(54) BEVERAGE BREWING SYSTEM AND METHOD

(75) Inventors: Steve Martin Rodriguez, Round Rock, TX (US); Anthony John Merkel, Austin, TX (US)

(73) Assignee: ENFLITE, INC., Georgetown, TX (US)

( * ) Notice: Subject to any disclaimer, the term of this patent is extended or adjusted under 35 U.S.C. 154(b) by 1714 days.

(21) Appl. No.: 12/475,310

(22) Filed: May 29, 2009

(65) Prior Publication Data

US 2010/0303983 A1     Dec. 2, 2010

(51) Int. Cl.
*A47J 31/057* (2006.01)
*A47J 31/44* (2006.01)

(52) U.S. Cl.
CPC ...................................... *A47J 31/44* (2013.01)

(58) Field of Classification Search
CPC ...... A47J 31/40; A47J 2201/00; A47J 31/057
USPC ............................................ 99/270, 300, 307
See application file for complete search history.

(56) References Cited

U.S. PATENT DOCUMENTS

| | | | | |
|---|---|---|---|---|
| 3,835,295 | A | * | 9/1974 | Ronchese ..................... 392/444 |
| 3,898,428 | A | | 8/1975 | Dye |
| 4,540,146 | A | * | 9/1985 | Basile ........................... 248/201 |
| 4,944,217 | A | | 7/1990 | Watanabe |
| 4,949,627 | A | | 8/1990 | Nordskog |
| 5,901,635 | A | | 5/1999 | Lucas et al. |
| 6,164,191 | A | | 12/2000 | Liu et al. |
| 7,146,904 | B2 | * | 12/2006 | Scribner ......................... 99/300 |
| 7,249,557 | B2 | | 7/2007 | Fouquet |
| 7,293,458 | B2 | | 11/2007 | Ramus et al. |

FOREIGN PATENT DOCUMENTS

| | | |
|---|---|---|
| JP | 10257975 | 2/2001 |
| KR | 1019990058602 | 7/1999 |
| KR | 1020060021482 | 3/2006 |
| WO | 0150875 | 7/2001 |
| WO | 0238105 | 5/2002 |

OTHER PUBLICATIONS

International Search Report and Written Opinion for PCT/US2010/036722 mailed Dec. 13, 2010. (pp. 1-9).
"Crate and Barrel—D_Longhi® Front Access Coffee Maker" from <http://www.crateandbarrel.com/family.aspx?c=710&f=25856>. Dec. 2, 2008. (2 pages).

(Continued)

*Primary Examiner* — Michele L Jacobson
*Assistant Examiner* — Hong T Yoo
(74) *Attorney, Agent, or Firm* — Cantor Colburn LLP

(57) ABSTRACT

Provided in some embodiments is a beverage brewing device that includes a housing and a fill-port located on front side of the housing. The fill-port includes an inlet that may accept a fluid supply container. Provided in some embodiments is a method of preparing a brewed beverage that includes coupling a fluid supply container to a fill-port located on a front side of a brewing device, routing a fluid contained in the fluid container from the fluid container to a heat-exchange device to heat the fluid, routing the heated fluid to a brewing container to brew the fluid, and routing the brewed fluid into a beverage container used for serving the brewed beverage.

26 Claims, 4 Drawing Sheets

(56) References Cited

OTHER PUBLICATIONS

"Newco Watercolors KB Series Bottled Water Brewers—Coffee Maker World" from <http://www.coffeemakerworld.com/newco-kbseries.html>. Dec. 2, 2008. (4 pages).

"AquaBrew TE-423 Bottled Water Coffee Maker, Brewer Only—shop.com" from <http://www.shop.com/AquaBrew_TE_423_Bottled_Water_Coffee_Maker,_Brewer_Only- . . . >. Dec. 2, 2008. (3 pages).

"Tassimo—Discover Tassimo" from <http://www.tassimodirect.com/Tassimo/discover/the_system.aspx>. Dec. 12, 2008. (2 pages).

"Bunn iMix-5 S Plus Instant Cappuccino Machine" from <http://www.coffeemakersetc.com/bunn-imix5-plus-instant-cappuccino-machine-wlcd-hopp . . . >. Dec. 12, 2008. (4 pages).

* cited by examiner

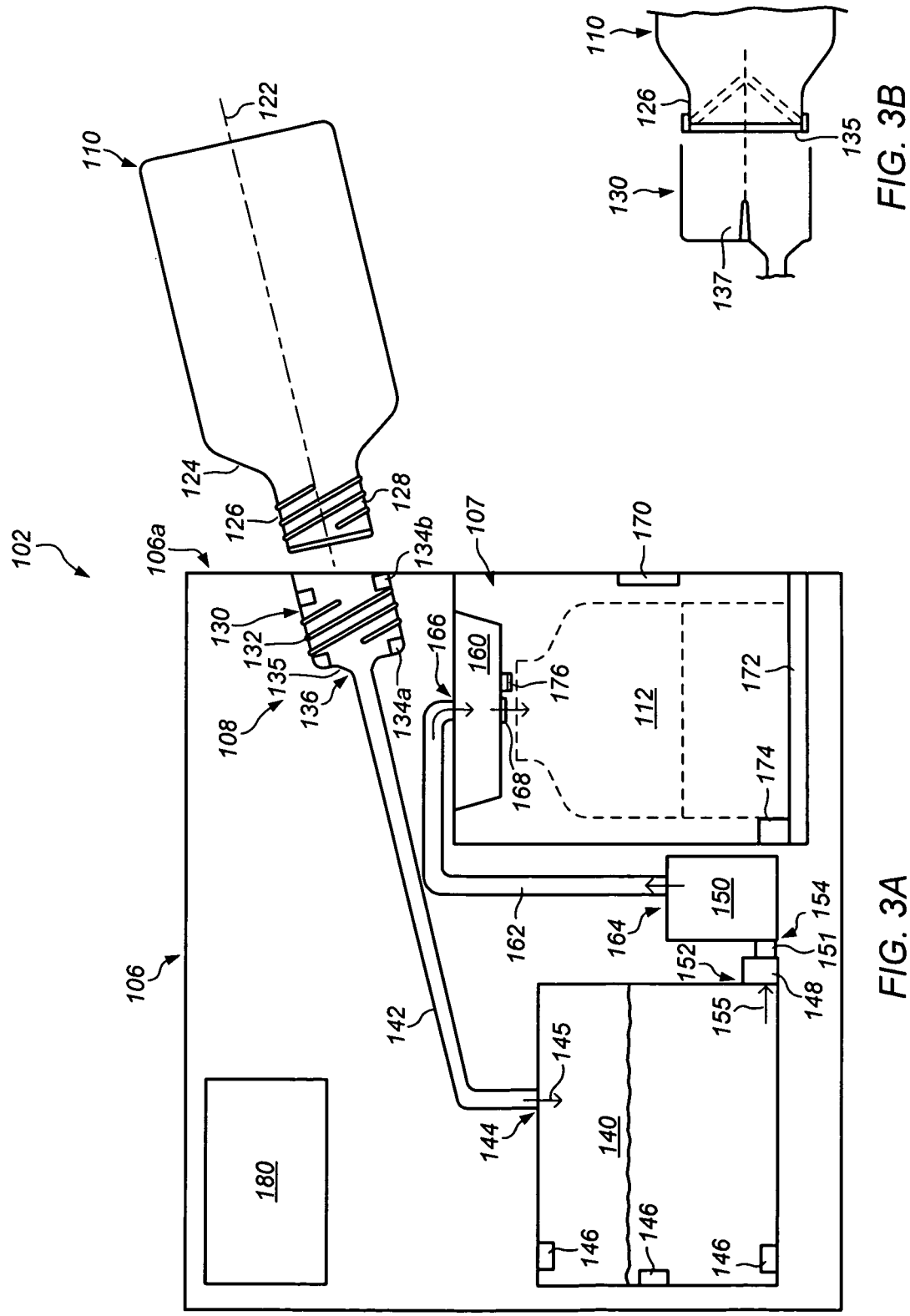

BEVERAGE BREWING SYSTEM AND METHOD

BACKGROUND

1. Field of the Invention

The present invention generally relates to systems and methods for brewing beverages and more particularly to a brewing system and method suitable for use in aircraft.

2. Description of Related Art

Brewed beverages, such as coffee, cappuccino, espresso, tea, and the like, are popular among a large portion of the population. Brewed beverages are often brewed and served in the home, places of business, restaurants, cafes, coffee shops, and on aircraft, among other locations. Traditionally, coffee and other beverages are brewed on-site and served warm. Accordingly, the brewing devices used for making brewed beverages are usually located in the respective homes, places of business, restaurants, cafes, coffee shops, aircraft, or other locations.

Over the years numerous brewing devices have been developed to accommodate preparing and serving brewed beverages at various locations. On aircraft, however, regulations may limit the location of fluids, such as water and coffee, with respect to electrical components in the aircraft. Such regulations may help to ensure that any leaks or spills do not affect operation of the aircraft. Unfortunately current aircraft beverage brewers, such as coffee makers, may require removal or significant movement of a brewing device which may lead to fluid leaking or spilling within the aircraft. For instance, a spill may occur when a coffee maker installed under a shelf or other obstruction in an aircraft's galley, is removed or slid-forward for cleaning, or moved to pour water into a top-fill of the coffee maker, or the like. Further, aircraft regulations may limit the temperature and quantity of heated fluids, such as water. These regulations may help to ensure that aircraft operators and passengers are not injured by heated water or coffee spilled due by turbulence or other disruptions.

In addition to design considerations with respect to the aircraft, the source of the water used to brew a beverage may be of concern. For instance, the type and quality of water used to brew coffee can significantly affect the overall flavor of the coffee. Unfortunately, when traveling around the world, aircraft often refill with water from local water supplies local to the airport where they are located. This can result in inconsistent and undesirable flavor due to the various types and qualities of water used. Accordingly, it may be desirable that a consistent type and quality of water be used to provide a flavorful quality coffee.

In view of these and other concerns, it may be desirable that a brewing device, such as an aircraft coffee maker, fit within certain space limitations of an aircraft's galley, reduce the likelihood of leakage or spillage of fluids, and capable of receiving fluids from a quality source.

SUMMARY

Various embodiments of coffee brewing systems and related apparatus, and methods of operating the same are described. In one embodiment, provided is a beverage brewing device that includes a housing having a fill-port located on a front side of the housing. The fill-port includes an inlet that accepts a fluid supply container.

In another embodiment, provided is a beverage brewing system that includes a rack for securing one or more modular devices and a modular brewing device that may fit within the rack. The modular brewing includes a housing that may be secured within the rack and a fill-port located on a front side of the housing. The front side of the housing and the fill-port is substantially accessible when then housing is secured within the rack. The fill-port includes an inlet that accepts a fluid supply container.

In yet another embodiment, provided is a method of preparing a brewed beverage that includes coupling a fluid supply container to a fill-port located on a front side of a brewing device, routing a fluid contained in the fluid container from the fluid container to heat-exchange device to heat the fluid, routing the heated fluid to a brewing container to brew the fluid, and routing the brewed fluid into a beverage container used for serving the brewed beverage.

BRIEF DESCRIPTION OF THE DRAWINGS

Advantages of the present invention will become apparent to those skilled in the art with the benefit of the following detailed description and upon reference to the accompanying drawings in which:

FIGS. 3A-3B are diagrams of a brewing device of the brewing system in accordance with one or more embodiments of the present technique.

Figure 1:
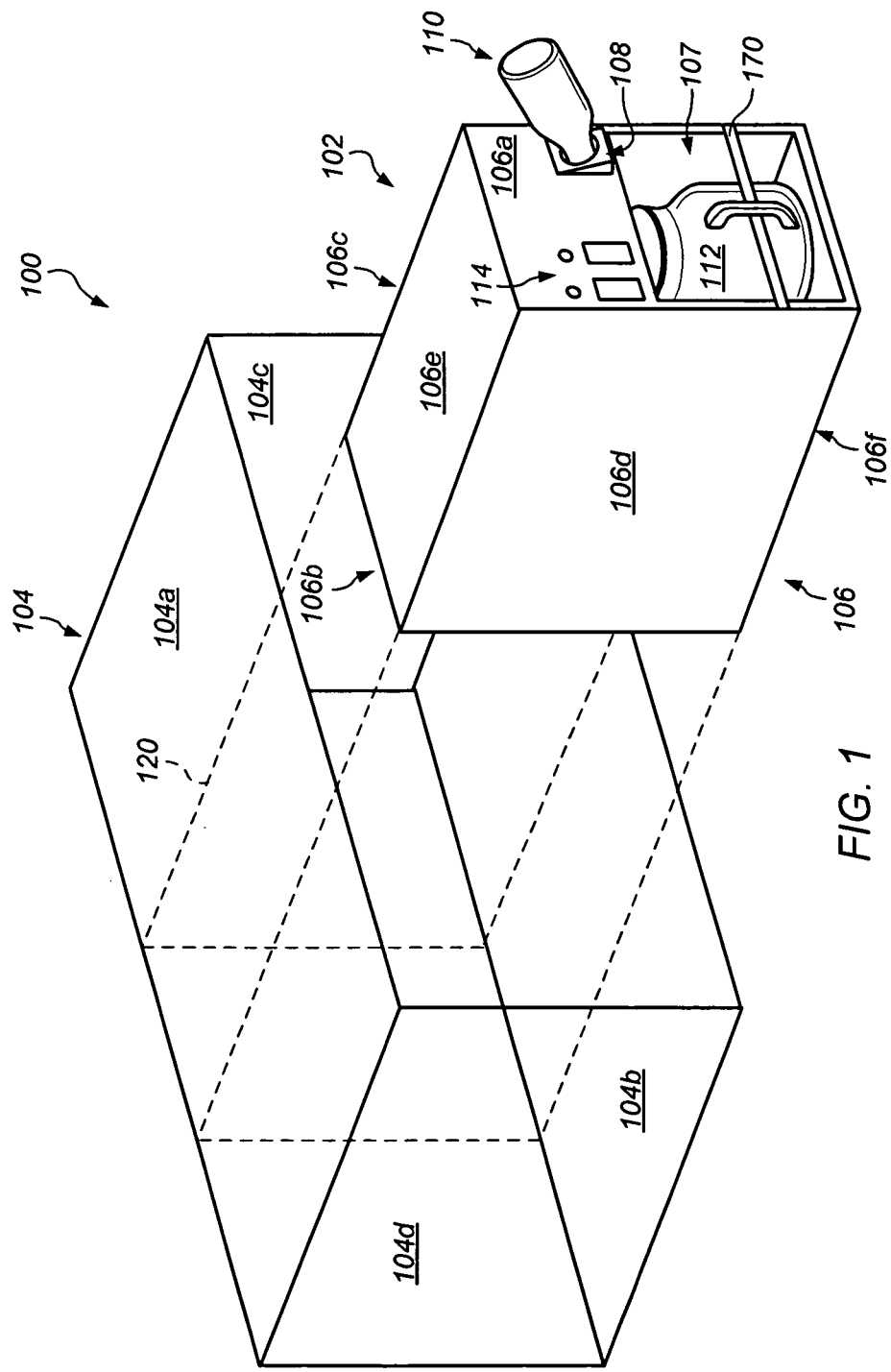
FIG. 1 is an illustration of a brewing system in accordance with one or more embodiments of the present technique.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF ILLUSTRATIVE EMBODIMENTS

As discussed in more detail below, certain embodiments of the present technique include a system and method for brewing a beverage, such as coffee, cappuccino, espresso, and the like. In certain embodiments, a brewing system includes a brewing device (e.g., a coffee maker) suitable for use on an aircraft. The brewing system includes, in some embodiments, a front-fill port that enables filling of the brewing device with a fluid from a front-side of the brewing device. In certain embodiments, a user may fill the brewing device from the front side without having to access other portions of the brewing device and/or remove the brewing device from a rack-mount or similar location. Further, in certain embodiments, the fill-port includes a nozzle that is configured to receive a fluid container, such as a bottle of water. When coupled to the nozzle, in some embodiments, the water bottle is in fluid communication with a reservoir and/or conduit such that water can be supplied to the brewing device via the water bottle. In some embodiments, the water bottle is located above the storage tank such that water is gravity-fed from the water bottle into the storage tank. Further, in certain embodiments, the brewing device includes a heating system that is configured to heat the water on-demand. In other words, the water is heated on an as-needed basis as opposed to heating the entirety of the water in a reservoir during a single brewing cycle. In some embodiments, the heating system includes an in-line heating element operated to selectively heat a reduced quantity of water (e.g., a single cup). Further, in some embodiments, the brewing device includes one or more sensors (e.g., pressure sensors or ultrasonic sensors) to detect the water level in one or both of the reservoir and/or a serving container (e.g., a coffee pot). The sensors are configured to detect when the water level is low or high in the reservoir and/or the serving container, in some embodiments. As discussed in more detail below certain embodiments include additional variations and arrangements of features that may be employed in one or more embodiments of the present technique.

Turning now to FIG. 1, depicted is a perspective view of a beverage brewing system 100 in accordance with one or more embodiments of the present technique. Brewing system 100 includes a brewing device 102 and a rack-mount 104. As described in further detail below, brewing device 102 may be inserted into and secured to rack-mount 104 during use of brewing system 100. As depicted, brewing system 100 includes a fill-port that is accessible from a front-side of the system such that a user can add a fluid to brewing device 102 without having to remove it from the brewing system 100 and/or the rack-mount 104. Such an embodiment may be useful in an environment, such as on aircraft, where space is limited, other devices are located above, below and/or to the sides of brewing device 102, and there is a desire to reduce the likelihood of spilling fluids used to supply the brewing device 102. Further, in one embodiment, a water bottle can be coupled to a nozzle of the fill-port. Such an embodiment may enable portable water bottles, such as those typically sold with bottled water, to be coupled to brewing device 102. In one embodiment, brewing system 100 may be configured to brew coffee. In such an embodiment, brewing device 102 may include a coffee-maker that is used to heat water, pass the water over coffee grounds, and dispense a resulting brewed coffee beverage for consumption. Other embodiments of brewing system 100 may include devices for preparing cappuccino, espresso, tea, other brewed/heated beverages, or a combination thereof.

In the illustrated embodiment, brewing device 102 includes a housing 106, a fill-port 108, a supply container 110, a serving container 112, and controls 114. In one embodiment, a supply fluid (e.g., tap water from a local water supply, filtered water, bottled water, or the like) is provided to brewing device 102 via fill-port 108. For example, in one embodiment, supply container 110 containing a supply fluid, such as water, is disposed into fill-port 108. The supply fluid may be routed from supply container 110 to a fluid reservoir via fill-port 108 and subsequently routed to a heating device where the fluid is elevated to a temperature suitable for brewing. The heated fluid may then be routed to a brewing location where it is it introduced to a brewing medium, such as ground coffee beans. The heated fluid may take on characteristics of the brewing medium (e.g., the flavor of the ground coffee beans), and may be subsequently dispensed. For instance, in the illustrated embodiment, brewed coffee may be dispensed into serving container 112 (e.g., a coffee pot).

Supply container 110 may include a container suitable for containing and distributing fluid to brewing device 102. In one embodiment, supply container 110 includes an opening (e.g., a nozzle) that can be inserted into fill-port 108 such that fluid can be transferred from supply container 110 into brewing device 102 via fill-port 108. For example, supply container 110 may be coupled (e.g., threaded into) to fill-port 108 such that fluid can be transferred from supply container 110 to brewing device 102 via fill-pot 108. In one embodiment, the contents of supply container 110 may be poured into fill-port 108 without coupling supply container 110 to fill-port 108. For example, fill-port 108 may include a funneling device that receives and directs water into brewing device 110.

Supply container 110 may take various forms, such as common water bottles used to transport, sell, and/or consume beverages. For example, supply container 110 may include a plastic bottle having a nozzle, such as a plastic bottle typically associated with bottled water. In one embodiment supply container 110 may include a cylindrical plastic bottle having a necked portion and a threaded nozzle that can be inserted, threaded, or otherwise coupled to fill-port 108. Accordingly, an operator (e.g., a flight attendant) may use a common water bottle, such as those typically purchased off-the-shelf, to fill/supply brewing device 102. Supply container 110 may include a container specifically designed to interact with brewing device 102 and fill-port 108. For example, supply container 110 may include a shape that is complementary to a feature of brewing device 102, such as a depression in housing 106, as described in more detail below with respect to FIGS. 2A-2C. The opening (e.g., nozzle) of supply container 110 may be complementary to fill-port 108. A nozzle of supply container 110 may include threads, detent features, a shape (e.g., square or round), keying features or the like that engage fill-port 108. For example, a nozzle of supply container 110 may includes threads that are complementary to threads of a nozzle of fill-port 108, as described in more detail below with respect to FIG. 3.

Housing 106 may include an enclosure that houses certain components of brewing device 102. In one embodiment, housing 106 may be formed from metal, plastics, composites, or the like. In the illustrated embodiment, housing 106 includes a generally box-like shape having six faces defining its exterior. More specifically, housing 106 includes a front face 106a, a back face 106b, a right face 106c, a left face 106d, a top face 106e, and a bottom face 106f. In the illustrated embodiment, each of faces 106a-106f is substantially planar flat face. In other embodiments, various shapes that form the exterior of housing 106 may define faces 106a-106f. For example, faces 106a-106f may have protrusion, depressions, recess, or the like that also define faces of the housing. In other words, in some embodiments, the faces of brewing device 102 may be defined by the direction portions of the brewing device 102 are facing or accessible from. Front face 106a includes a portion of the housing that is generally accessible from a front side of the brewing device 102 during use. The front side may be defined as the side of the brewing device that includes a majority of controls, inputs, serving containers, and other portions that are accessed during normal use of the brewing device. For example, front face 106a may include a face that faces outward from a rack-mount when installed such that front face 106a is accessible by a user. Further, surrounding components, devices, or the like may not substantially obstruct front face 106a. Front face 106a thus may be generally accessible even when brewing device 102 in inserted into rack-mount 104. As described in more detail below, when brewing device 102 is installed into rack-mount 104, access to other portions of housing 106, such as top-face 106e and bottom-face 106f may be obstructed by walls of rack-mount 104 and/or other devices installed in rack-mount 104. Housing 106 also includes an opening 107 that is shaped to accept serving container 112. In the illustrated embodiment, opening 107 includes a recess in front face 106a that extends inward toward an interior of housing 106.

Figure 2A:
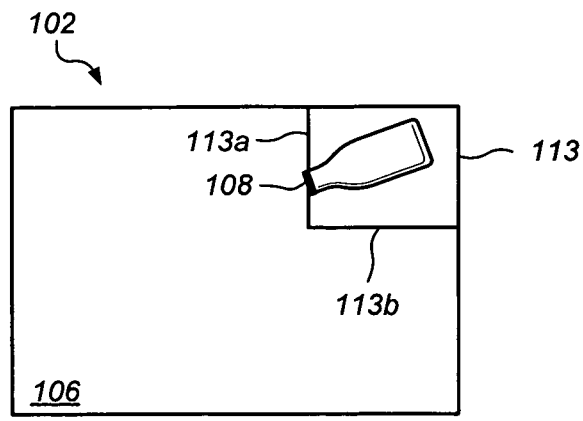
FIGS. 2A-2C are diagrams of a brewing device of the brewing system in accordance with one or more embodiments of the present technique.
Figure 2B:
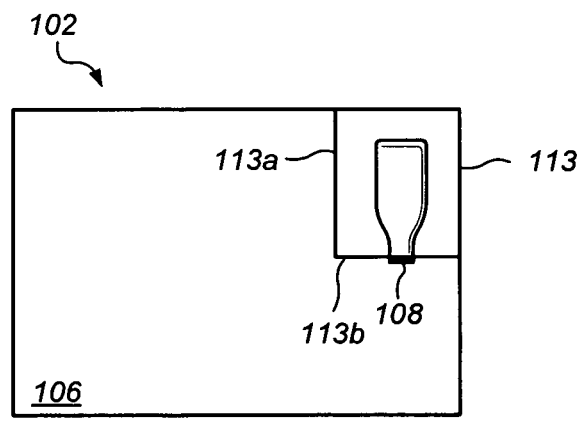
Figure 2C:
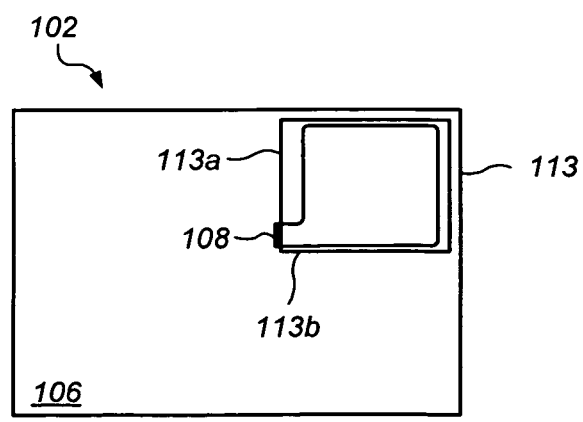

FIGS. 2A-2C illustrate various embodiments of brewing device 102 in accordance with one or more embodiments of the present technique. More specifically, FIG. 2A depicts an embodiment that includes a pocket 113 in front face 106a. Pocket 113 completely houses supply container 110 when it is inserted/engaged with fill-port 108. In other words, supply container 110 is recessed into pocket 113 such that a majority, substantially all, or all of supply container does not extend beyond a plane substantially defining front face 106a or other components located on front face 106a. Such a design may reduce the likelihood of a passer-by accidentally bumping into, dislodging and/or damaging supply container 110. In the illustrated embodiment, pocket 113 includes a rectangular shape and fill-port 108 is located on a back face 113a of pocket 113. Other embodiments may include variations in the shape of pocket 113 and location of fill-port 108.

FIG. 2B illustrates another embodiment in which fill-port 108 is located on a bottom face 113b of pocket 113. As depicted, this may enable supply container 110 to be oriented in a substantially vertical configuration. Such an orientation may help to ensure that all or substantially all of fluid in supply container 110 is deposited into brewing device 108.

FIG. 2C illustrates an alternate embodiment that includes a pocket 113 having a shape that substantially conforms to a shape of supply container 110. As described above, supply container 110 is recessed into pocket 113 such that a majority, substantially all, or all of supply container does not extend beyond a plane substantially defining front face 106a or other components located on front face 106a. More specifically, in the illustrated embodiment, pocket 113 includes a substantially rectangular shape enclosed on three sides and supply container 110 includes a substantially rectangular shape that is complementary to the shape of pocket 113. Such an embodiment may enable modular supply containers to be used and interchanged. In the illustrated embodiment, fill-port 108 is located on a lower portion of back face 113a of pocket 113, and the nozzle of supply container 110 is located in a complementary position substantially near the bottom of supply container 110. Other embodiments may include any suitable arrangements of supply container 110 and/or fill-port 108. For example, fill-port 108 may protrude from front face 106a such that all, substantially all or only a portion of supply container 110 extends from front face 106a and/or is not contained within a pocket or similar recess. Fill-port 108 may be located on other faces of housing 106, pocket 113, or the like that are readily accessible when brewing device 102 is positioned for use (e.g., installed in rack-mount 104).

In some embodiments, brewing device 102 may include additional controls and/or indicators. An operator may use the controls/indicators to set certain characteristics of operation and/or to assess certain operational characteristics. Controls/indicators may be used to start/stop a brewing cycle, to set brewing parameters (e.g., brewing temperature), to assess a water level in a reservoir or the serving container, and/or to assess whether an error has occurred with the brew cycle. Controls/indicator may include buttons, light-emitting diodes (LEDs), and the like for input and observation by an operator. In the illustrated embodiment, brewing device 102 includes controls/indicators 114 located on front-face 106a of the housing 106. Other embodiments may include controls located on various faces of housing 106, such as a master power switch located on a side or rear face of housing 106.

In some embodiments, rack-mount 104 may include a rack, a modular-rack, a shelf, cabinet, or the like used for mounting brewing device 102. In one embodiment, rack-mount 104 includes a modular-rack of an aircraft used to house one or more modular devices. Such a rack-mount may typically be used in the kitchen/galley of aircraft, trains, buses, or other transportation vehicles. Rack-mount 104 may be used to house modular units, such as modular coffee-makers, modular refrigerators, modular storage bins, and the like. Modular-racks may be characterized by common width, depth, and/or mounting features that enable the exchange one modular unit with another modular unit. For example, in the illustrated embodiment, the box-shaped housing 106 of brewing device 102 may slide into one or more modular racks of rack-mount 104 as indicated by dashed lines 120. When brewing device 102 is installed in rack-mount 104, certain portions of rack-mound 104 and/or other device may obstruct, block, and/or prevent access to one or more portions of brewing device 102. For example, when brewing device 102 is installed into to rack-mount 104, a top-rack portion 104a and a bottom-rack portion 104b of rack-mount 104 may block access to top-face 106a and bottom face 106f, respectively. Similarly a side-rack portion 104c, back-rack portion 104d or other devices installed in adjacent slots of rack-mount 104 may block or limit access to right-side face 106c, left side-face 106d and/or back-face 106b. In some embodiments, access to the other faces 106b-106f may be provided by sliding or otherwise removing brewing device 102, and/or adjacent devices, at least partially out of rack-mount 104. Accordingly, access to brewing device 102 may be limited to front-face 106a.

FIG. 3A illustrates brewing device 102 in accordance with one or more embodiments of the present technique. In the illustrated embodiment, supply container 110 includes a cylindrical bottle having a longitudinal axis 122, a necked portion 124, and a nozzle 126. During use, supply container 110 may be coupled to brewing device 102 by inserting/engaging nozzle 126 with fill-port 108. In the illustrated embodiment, fill-port 108 includes a complementary nozzle located on front-face 106a of housing 106. More specifically, fill-port 108 includes a complementary nozzle 130 having a hollow cylindrical recess that may accept nozzle 126. In the illustrated embodiment, nozzle 126 includes a threaded engagement feature 128. In the illustrated embodiment, complementary nozzle 130 includes a complementary engagement feature 132 that is threaded to mate with the threads of engagement feature 128. Engagement features 128 and 132 may include standard right hand or left hand threads and/or include detent features, such that nozzle 126 of supply container 110 may be inserted into nozzle 130 of fill-port 108, and supply container rotated about longitudinal axis 122 to engage fill-port 108. In certain embodiments, threads and/or detent features may be employed such that supply container 110 may be rotated a portion of turn (e.g., one-eight of a turn, on-quarter of a turn, half of a turn, three-quarters of a turn), or one or more turns to engage fill-port 108. In some embodiments, fill-port 108 may include a shape that assists with the insertion of supply container 110. For example, an end of fill-port 108 in which supply container 110 is inserted (e.g., the end proximate front face 106a) may include a chamfered edge or similar shape that helps to capture/direct nozzle 126 of supply container 110 into nozzle 130 of fill-port 108.

In other embodiments, an engagement feature may not be provided on one or both of supply container 110 and fill-port 108. For example, in one embodiment, nozzle 126 may be inserted into the recess of nozzle 130 and remain coupled to one another via a friction fit, interference fit or some other force. In one embodiment, the outside diameter of nozzle 126 may be slightly less than, equal to, or slightly larger than the inside diameter of nozzle 130 such that a tight/interference fit is created between nozzle 126 of supply container 110 and nozzle 130 of fill-port 108. The tight/interference fit may help to retain supply container 110 such that it does not easily dislodge from fill-port 108 once inserted. In some embodiments, additional elements may be employed to create a tight/interference fit. For example, sealing elements may be disposed on the inside diameter of nozzle 130 to create interference (e.g., contact) with nozzle 126 of supply container 110. For example, elastomeric seals may be employed with an inside diameter less than the outside diameter of nozzle 126 of supply container 110. When nozzle 126 is inserted into nozzle 130, the seals may deflect around nozzle 126 to create an interference fit that helps to retain supply container 110 and may also provide sealing between nozzle 126 and nozzle 130. The interference fit may be employed such that supply container 110 can be inserted into and removed from fill-port 108 with a reduced force that enables an operator (e.g., a flight attendant) to quickly and easily remove, insert, and/or exchange supply containers.

As mentioned briefly above, in one embodiment, one or more sealing elements may be provided between the supply container 110 and fill-port 108 to reduce the likelihood of fluid (e.g, water) spilling or leaking. For example, in the illustrated embodiment, a first sealing element 134a and a second sealing element 134b are disposed in the interior of nozzle 130. Sealing elements 134a and 134b may provide a complete or partial fluid seal between the interior surface of nozzle 130 and the exterior surface of nozzle 126 when supply container 110 is inserted into fill-port 108. In one embodiment, sealing elements 134a and 134b may each include a circular ring formed from an elastic material (e.g., a plastic or polymeric ring) to provide a seal between an interior face of nozzle 130 of fill-port 108 and an end of nozzle 126 of supply container 110. In other embodiments, additional sealing elements may be used, only one of sealing element 134a and 134b may be used, or no sealing elements may be used. Further, sealing elements 134a and 134b or other sealing elements may provide an interference fit that helps to retain supply container 110, as described above.

In one embodiment, supply container 110 may include a cover that helps to prevent water from leaking from supply container 110 before it is installed in and after it is removed from fill-port 108. FIG. 3B illustrates a penetrable cover that is pierced punctured, or otherwise opened by a complementary feature of fill-port 130. As depicted, supply container 110 includes a nozzle cover 135 disposed over an opening of nozzle 126. Nozzle cover 135 may act to retain fluid from leaking from supply container 110 before it is installed in fill-port 108. In one embodiment, nozzle cover 135 may include a solid medium that is not punctured, or a medium that is perforated or previously punctured. Nozzle cover 135 may be formed from an elastomeric material (e.g., a plastic or rubber). Nozzle cover 135 may be preinstalled on each of supply containers 110, or may include a removable component that is exchanged from one supply container to at or near the time of use. During use, nozzle cover 135 may be penetrated by a protrusion 137 located in or near fill-port 108. For example, in the illustrated embodiment, protrusion 137 is located in a rear portion of nozzle 132 and is arranged to puncture, or otherwise open nozzle cover 135 to enable fluid to flow from container 110 when supply container 110 is installed in fill-port 108. When supply container 110 is removed from fill-port 108, the absence of the protrusion may enable nozzle cover 135 to substantially or completely close, thereby limiting fluid leakage from supply container 110.

Returning now to FIG. 3A, fill-port 108 may be located above a reservoir or other fluid containment device such that fluid (e.g., water) is gravity fed from supply container 110 into brewing device 102. For example, in the illustrated embodiment fill-port 108 is located above a reservoir of brewing device 102, such that fluid poured into fill-port 108 is gathered and routed via a conduit to a reservoir. In the illustrated embodiment, fill-port 108 includes a cylindrical shape that acts as a funnel to direct the water into a conduit for use in brewing device 102. In other embodiments, the shape of fill-port 108 may be modified to further assists the routing of water to the interior of brewing device 102. For example, fill-port 108 may include a funnel shaped portion 135 (e.g., a cone shape at the end proximate an outlet 136 of fill-port 108), ridges, grooves, channels, or the like to help direct water to the conduit. For example, the interior surface of nozzle 130 may include channels that direct water to the outlet 136 of fill-port 108 proximate the conduit.

In one embodiment, fill-port 108 is in fluid communication with a reservoir or a similar fluid containment device for directing fluid to other components of brewing device 102 (e.g., a heating device). In the illustrated embodiment, fill-port 108 is coupled to a reservoir 140 via a conduit 142. Conduit 142 extends from outlet 136 of fill-port 108 to an inlet 144 of reservoir 140. Fluid routed through conduit 142 may be gravity-fed downward into reservoir 140 in the direction of arrow 145. In one embodiment, conduit 142 includes a rigid, semi-rigid or flexible hollow tube. For example conduit 142 may be formed from metal tubing (e.g., copper tubing, plastic tubing, or elastomeric tubing.

Reservoir 140 may be used to store fluids for use in brewing. For example, reservoir 140 may hold a volume of water equal to or greater than the volume of water needed for a single brewing cycle. In other words, reservoir 140 may hold enough water for one, two, three, four, five, six, seven, eight, nine, ten or more brewing cycles. Each brewing cycle may be capable of producing one or more servings of a beverage. For example, each brewing cycle may be capable of producing enough of a brewed beverage for one, two, three, four, five, six, seven, eight, nine, ten, eleven, twelve, or more cups of coffee. In another embodiment, reservoir 140 may hold a volume of water for a single brewing cycle or a single serving or less. For example, in one embodiment, reservoir 140 may hold only enough water for a single serving of a brewed beverage.

In one embodiment, brewing device 102 may not include a reservoir of substantial volume, or may not have a reservoir at all. For example, in one embodiment, brewing device 102 may include a conduit that extends directly from outlet 136 of fill-port 108 to another component (e.g., heating device) of brewing device 102. Such an embodiment may rely on the volume of water contained in conduit 142 and/or supply container 110 to acts as a reservoir and/or fluid supply for brewing.

In one embodiment, reservoir 140 may include one or more devices that are capable of detecting a water level in reservoir 140. In the illustrated embodiment reservoir 140 includes a sensors 146 located on interior top, bottom, and wall/side surfaces of reservoir 140. Embodiments may include any number of sensors 146. For example, a single sensor 146 may be located at or near a bottom surface of reservoir 140. Each sensor 146 may be operated to detect whether or not the water level in reservoir 140 is low (e.g., empty) or high (e.g., full) or in-between (e.g., low). In one embodiment, sensor 146 includes a pressure sensor. In such an embodiment, sensor 146 may include a pressure sensor/transducer that is disposed in the fluid reservoir/container such that it is submerged when fluid is contained in the reservoir/container. For example, sensor 146 may be located on a bottom-interior surface of reservoir 140 and/or on a side of reservoir 140 at or below an expected water level. Sensor 146 may be capable of sensing and transmitting data indicative of the hydrostatic pressure of water at or above the level of sensor 146. For example sensor 146 may include a diaphragm that is capable of sensing the hydrostatic pressure of the water. One or multiple sensors 146 may be included at other locations (e.g., at different points on the bottom of the reservoir/container, or located at various heights along a wall/side of the reservoir/container) to more accurately gather fluid/water level data. In one embodiment, sensor 146 includes an ultra-sonic sensor used to assess the fluid/water level. In such an embodiment, ultrasonic sensor 146 may generate an ultrasonic signal that reflects off of the fluid/water, and a fluid/water level may be assessed and determined based at least on the time it takes for the reflected signal to return to sensor 146. Processing of the signal may be provided in additional circuitry of brewing device 102, discussed in more detail below. Other embodiment may include any number of additional types, combinations, and locations of sensors. For example, other embodiments may include any combination of pressure and ultrasonic sensors 146 suspended inside reservoir 140, located on or proximate the interior or exterior side, top, or the bottom surfaces of reservoir 140.

In one embodiment, water is routed from reservoir 140 to a pump 148. Pump 148 may include a fluid pump capable of advancing water from an outlet of reservoir 140 to a heater 150 or other downstream devices. For example, in the illustrated embodiment, water routed into heating device 150 is gravity-fed from an outlet 152 reservoir 140, to pump 148 in the direction of arrow 155. Pump 148 may generate water flow from reservoir 140 to heater 150 in the direction of arrow 155. The resulting flow may include a sufficient pressure such that the water is directed into an inlet 154 of heater 150 via conduit 151. In the illustrated embodiment, pump 148 is coupled directly to outlet 152 of reservoir 140. In one embodiment, pump 148 may be located inside of or integral with reservoir 140, or coupled to outlet 152 via a conduit such that it is outside of and not directly coupled to outlet 152. In the illustrated embodiment, pump 148 is located substantially at or near the base (e.g., bottom surface) of reservoir 140 such that substantially all of the fluid in reservoir 140 can be gravity fed to pump 148. In one embodiment, pump 148 may be located above/elevated with respect to the base of reservoir 140. In such an embodiment, pump 148 may induce a suction that is capable of drawing the water up to an inlet of pump 148. In an embodiment in which there is no reservoir, conduit 142 may couple directly to inlet pump 148.

In one embodiment, a pump may not be used and heating device 150 may be gravity fed directly from reservoir 140. In such an embodiment, may be gravity-fed into the heating device 150 in the direction of arrow 155. For example, conduit 151 may extend directly from an outlet 152 near the base of reservoir 140 to an inlet 154 of heating device 150. In one embodiment, outlet 152 of reservoir 152 may be coupled directly to inlet 154. In an embodiment in which there is no reservoir, conduit 142 may couple directly to inlet 154.

Heating device 150 may be used to heat the water to a temperature suitable for brewing. Water for coffee, for example, may be heated in a range of about 195 to 205 degrees Fahrenheit, although other heating temperatures are contemplated. In one embodiment, heating device 150 includes a heat exchange device, such an electric coil that transfers energy in the form of heat to the water. The heated water is routed to a brewing station 160 via a conduit 162. In the illustrated embodiment, conduit 162 extends between exit 164 of heating device 150 and inlet 166 of brewing station 160. Pump 148 may create a sufficient fluid flow and pressure to raise the water trough conduit 162 to brewing station 160.

In one embodiment, heating device 150 may heat a reservoir of fluid. For example, heating device 150 may include one or more heating elements located adjacent or inside of reservoir 140. In such an embodiment, heat may be transferred from heating device 150 into the fluid located in reservoir 140, such that the fluid is heated while it is located within reservoir 140.

Brewing station 160 may include a portion of brewing device 102 that enables the heated water to interact with a brewing medium to generate the heated beverage. For example, in an embodiment in which brewing device 102 is a coffee maker, brewing station 160 may include a basket used to hold ground coffee beans. In such an embodiment, brewing station 160 may also include a replaceable filter that holds the ground coffee beans and enables the heated water to pass slowly over the coffee beans to acquire the flavor of the coffee beans. Once the heated water has been sufficiently brewed into coffee, it may exit brewing station 160 and is dispensed into serving container 112. For example, in the illustrated embodiment, the brewed beverage (e.g., coffee) is dispensed from an outlet 168 of brewing station 160 into an opening of serving container 112. In an embodiment used to provide only a heated fluid (e.g., a fluid not brewed, such as hot water), the heated fluid may be routed around brewing station 160, or a brewing station may not be present, such that the heated fluid is routed from heating device 150 directly to outlet 168 or another outlet of brewing device 102.

In one embodiment, serving container 112 may include a coffee pot that is capable of one or more servings of coffee or a similar brewed beverage. In another embodiment, serving container may include a cup, bottle, mug, or similar container that holds one or more servings of a brewed beverage (e.g., one or several cups of coffee).

Brewing device 102 may also include one or more others features conducive to safe operation. For example, in the illustrated embodiment, a retainer 170 extends across an opening in front face 106a to retain serving container 112. In one embodiment, retainer 170 may include a bar-shaped member or protrusion that extends at least partially across the opening 107 where serving container 112 is located (see FIG. 1). Retainer 170 may be movable such that an operator (e.g., a flight attendant) may easily engage/disengage retainer 170. Such a device may help to prevent serving container 112 from falling, spilling, or moving, during landing, takeoff, and turbulence, for instance.

In the illustrated embodiment, brewing device 102 includes a heating pad 172. Heating pad 172 may include a heating device that is used to heat the contents of serving container 112 while it is seated in opening 107. In one embodiment, heating pad 172 may include an electrical heating element that remains energized for a predetermined period of time after a brew cycle, as long as the brewing device is on, based on a selection of an operator, and/or based on whether or not a serving container is present. In one embodiment, heating device 150 and heating pad 172 may share common heating components. For example, a single coil may be employed for heating both.

Brewing device 102 may also include a serving container detection device 174. Such a device may be used to assess and determine whether or not serving container 112 is present. For example, in one embodiment, brewing device 102 includes supply container detection device 174 located proximate the expected seated location of serving container 112 (e.g., in the back of the opening for supply container 112). In one embodiment, serving container detection device 174 includes an electrical sensor (e.g., a proximity sensor/switch or an ultrasonic sensor), a mechanical switch (e.g., an articulating arm) that can detect whether or not serving container 112 is present. Such a device may enable brewing device 102 to adjust operation to prevent accidental spill, leaks, and the like. For example brewing device 102 may prevent the beverage from being dispensed form outlet 168 and/or suspend a brewing cycle when a serving container is not present or properly seated in opening 107. Further, operation of heating pad 172 may be based on whether or not a serving container is present and/or properly seated.

In one embodiment, brewing device 102 may also include one or more devices that are capable of detecting a beverage level in serving container 112. For example, the illustrated embodiment includes a sensor 176 located on a bottom surface of brewing station 160. Sensor 176 may be operated to detect whether or not the beverage level in serving container 112 is low (e.g., empty) or high (e.g., full) or in-between (e.g., low). In one embodiment, sensor 176 may include an ultrasonic sensor used to assess the beverage level. The ultrasonic sensor may generate an ultrasonic signal that reflects off of the beverage, and a beverage level may be assessed and determined based at least on the time it takes for the reflected signal to return to sensor 176. Processing of the signal may be provided by circuitry of brewing device 102, discussed in more detail below. Other embodiments may include any number of additional types and locations of sensors. For example, one embodiment may include one or more sensors 176 (e.g., pressure or ultrasonic sensors) located on the sides or bottom of the opening for serving container 112, integrated with heating pad 172, integrated with serving container 112, or a combination thereof.

As depicted, brewing device 102 may also include control device 180. In one embodiment, control device 180 may include power circuitry, such as a power receptacle for receiving and distributing power to various components (e.g., heating device 150) of brewing device 102. In one embodiment, control device 180 may include an inverter, rectifier, transformer, switches, or the like. Control device 180 may also include control circuitry used to control operation of brewing device 102. For example, control device 180 may include electrical circuitry that controls the brewing characteristics (e.g., brewing time and temperature) as well as various sensors of brewing device 102. In one embodiment, control circuitry may include a memory device, integrated circuits, or other similar devices that store and/or implement operational routines or software. Control circuitry may be used to send and/or receive outputs and/or inputs to and from a user (e.g., via controls 114), to send and/or receive outputs and/or inputs to and from sensors (e.g., sensors 146 and 176) and the like.

Operation of brewing device 102 may be varied in some embodiments. In some embodiment, a single brewing cycle may be used to brew all of the water in reservoir 140. For example, in one embodiment, heating device 150 may be operated until all of the water in the reservoir has been heated and brewed. In another embodiment, a single brewing cycle may brew less than all of the water in reservoir 140. Such operation may be particularly well suited where smaller servings are desired, and/or where the amount of water in reservoir 140 is greater than the capacity of serving container 112. One embodiment may include "on-demand" operation of the heating device. For example, the heating device 150 may include an in-line heat exchanger that is selectively operated to heat only enough water for a desired serving size (e.g., a single cup of coffee). In such an embodiment, an operator (e.g., a flight attendant) may provide a request for a single cup of coffee by pressing one of controls 114 to prompt brewing device 102 to heat and brew a single serving of a beverage that is dispensed into serving container 112. This may be useful when only single serving is desired and it would otherwise be wasteful to heat a greater quantity of water. For example, an aircraft may only have a limited amount of water available for brewing coffee. Such operation may also reduce the amount of heated water stored on an aircraft at any given time, thereby reducing risk of heated fluids contacting passengers or operators during unexpected flight conditions, such as a crash or turbulence.

Figure 4:
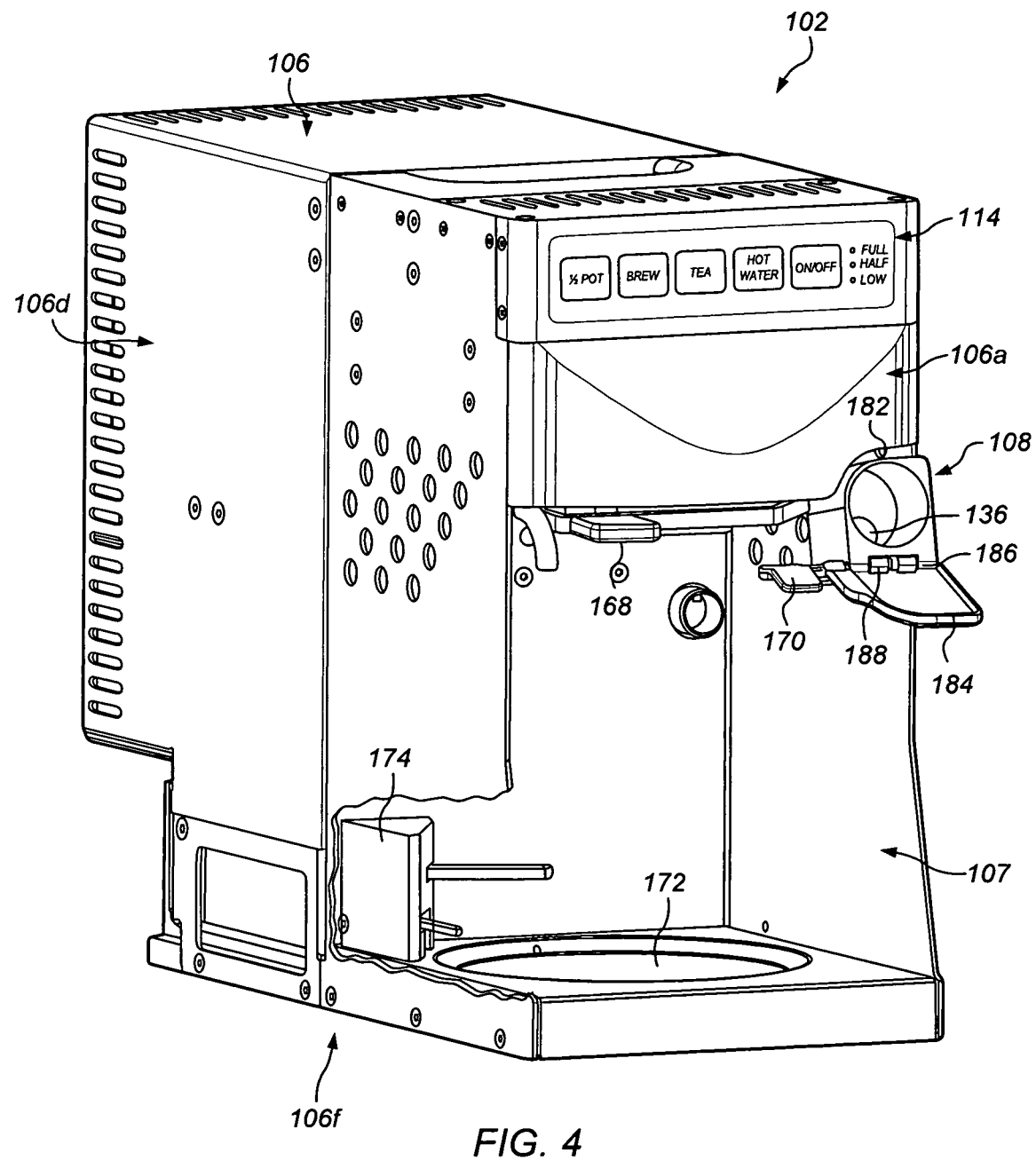
FIG. 4 is a perspective view of an embodiment of the brewing device in accordance with one or more embodiments of the present technique.

FIG. 4 is a perspective view of brewing device 102 in accordance with one or more embodiments of the present technique. In the illustrated embodiment, brewing device 102 includes housing 106, fill-port 108, controls 114, outlet 168, heating pad 172, serving container detection device 174, and severing retainer 170. In the illustrated embodiment, each of back face 106b, right face 106c, left face 106d, top face 106e, and bottom face 106f does not include any portion or controls of brewing device 102 that may require access by an operator during normal operation. For example, faces 106b-f do not include a fill-port, controls, an opening for a serving container, or the like that may be used by an operator during filling, serving and/or regular cleaning/maintenance. As discussed above, faces 106b-f of brewing device 102 may be obstructed by rack-mount 104 and/or other adjacent devices (such as other brewing devices or modular devices) when brewing device 102 is installed in rack-mount 104. Fill-port 108 and controls 114 are located on or substantially near front-face 106a of housing 106. Accordingly, fill-port 108 and controls 114 are accessible from a front side of brewing device 102 even when brewing device 102 is installed in a rack-mount as described with respect to FIG. 1.

In the illustrated embodiment, controls 114 include buttons labeled as "½ POT", "BREW", "TEA", "HOT WATER", and "ON/OFF". Controls 114 also include LEDs labeled "FULL", "HALF", and "LOW". In one embodiment the "½ POT" button may be depressed to brew one-half pot of coffee, the "BREW" button may be depressed to start and stop a brewing cycle, the "TEA" button may be depressed to brew tea as opposed to coffee, the "HOT WATER" button may be depressed to provide heated water that is not passed over a brewing medium, and the "ON/OFF" button may be depressed to toggle power to the brewing device 102 on and off. In one embodiment, the LEDs may be lit to indicate a level of water or other fluid in the reservoir 140. For example, senor 146 may provide a signal indicative of the fluid level to control circuitry 180, and control circuitry 180 may control which LED is lit. Such a feature may be useful for an operator to quickly assess whether or not water needs to be added to the brewing device 102.

In the illustrated embodiment, fill-port 108 is located at least partially within opening 107. A top portion of fill-port 108 is located in a cutout 182 in a right side of front face 106. In the illustrated embodiment, fill-port 108 is angled relative to the horizontal plane such that fluid poured into fill-port 108 is gravity fed to outlet 136. More specifically, fill-port 108 angles downward from its front end to its back end (e.g., higher at the end where supply container 110 is inserted and lower at the side where outlet 136 is located).

Further, fill-port 108 includes a cover 184 that can be used to open and close nozzle 132 of fill-port 108. For example, cover 184 is rotatably coupled to the lower-font edge of fill-port 108 such that it may rotate upward to cover the opening of nozzle 132, and may rotate downward to provide access to the opening of nozzle 132. In the illustrated embodiment, cover 184 is rotatably coupled by a hinge mechanism 186 and biased to a closed position via a biasing member 188. The hinge mechanism 186 may include a pin running along the rotating axis of hinge mechanism 186. In other embodiments, hinge mechanism 186 may include a living hinge or similar hinge device that enables rotation of cover 184 relative to fill-port 108. In one embodiment, cover 184 may not be biased into one or both of the opened and closed positions. In the illustrated embodiment, biasing member 186 includes a torsional spring disposed between cover 184 and the body of fill-port 108. Other embodiments may include linear springs, or similar elastic members configured to bias cover 184 open and/or closed.

A method of operating brewing device 102 in accordance with one or more embodiments of the present technique may include providing fluid via front side of the brewing device, routing fluid from the fluid supply to a reservoir and/or a heating device, heating the fluid to a desired temperature, brewing and/or dispensing the resulting brewed beverage for serving. In one embodiment, providing fluid via front side of the brewing device may include inserting at least a portion of supply container 110 into fill-port 108 such that fluid may be transferred from supply container 110 to brewing device 102 via fill-port 108. In some embodiment, inserting at least a portion of fluid supply container 110 may include threading or otherwise engaging engagement/sealing features of supply container 110 with complementary engagement/sealing features of fill-port 108. In one embodiment, routing fluid from the fluid supply to a reservoir and/or a heating device may include routing fluid via conduit 142 from outlet 136 to inlet 144 of reservoir 140 and from outlet 152 of reservoir 140 to inlet 154 of heating device 150 via conduit 151. Heating the fluid to a desired temperature may include performing a brewing cycle to heat multiple servings of a beverage (e.g., heating all or at least a portion of the fluid contained in reservoir 140) or performing a brewing cycle to heat only a single serving of a beverage (e.g., on-demand heating of the fluid). Heating the fluid may include heating the fluid to a temperature of 195 to 205 degreed Fahrenheit. Brewing and/or dispensing the resulting brewed beverage for serving may include passing the heated fluid over a brewing medium in brewing station 160 and dispensing the brewed beverage from outlet 168 into serving container 112 from which the beverage can be served. As is apparent each of the steps that may be performed by an operator, such as providing fluid and accessing the serving container may be accomplished with only access to the front face/side of the brewing device. Such a method may be desired because it does not require access to portions of the brewing device that are not easily accessed (e.g., obstructed by an associated rack-mount or adjacent devices).

Although the above discussion has provided some descriptions with respect to brewing devices, such as coffee makers used in aircraft, the present technique may be adapted for use in any number of applications. For example, the described features may be employed in home use and commercial establishments, as well as for use in any number of transportation vehicles including but not limited to commercial aircraft, private aircraft, trains, buses, recreational vehicles, and the like. Further each of the described techniques may be adapted for use with any similar form of brewed/heated beverages, such as coffee, tea, cappuccino, espresso, hot chocolate, hot water, and the like.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. It is to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a nozzle" includes a combination of two or more nozzles." The words "include", "including", and "includes" mean including, but not limited to.

What is claimed is:

1. A beverage brewing device, comprising:
   a housing; and
   a fill-port located on a front side of the housing, wherein the fill-port comprises an inlet configured to accept to a fluid supply containers;
   wherein the front side comprises a side of the beverage brewing device housing that faces toward a user when the brewing device is installed in a rack-mount;
   wherein the beverage brewing device comprises a modular brewing device configured to be installed in an aircraft rack-mount having a top-rack portion that blocks access a top face of the housing.

2. The beverage brewing device of claim 1, wherein the fill-port is accessible to receive fluid from a supply container when the beverage brewing device is installed for use.

3. The beverage brewing device of claim 1, wherein the fill-port comprises a nozzle.

4. The beverage brewing device of claim 3, wherein the nozzle of the fill-port is complementary to a nozzle of the fluid supply container.

5. The beverage brewing device of claim 3, wherein the nozzle of the fill-port comprises an inner diameter larger than an outer diameter of the nozzle of the fluid supply container, such that the nozzle of the fluid supply container may be slid into the nozzle of the fill-port.

6. The beverage brewing device of claim 1, wherein the fill-port comprises an engagement feature configured to engage a complementary engagement feature of the fluid supply container.

7. The beverage brewing device of claim 6, wherein the engagement feature comprises a protrusion configured to puncture a portion of the fluid supply container.

8. The beverage brewing device of claim 1, wherein the fill-port is located in a recess of the front side.

9. The beverage brewing device of claim 8, wherein the recess is configured to house all or substantially all of the fluid supply container.

10. The beverage brewing device of claim 1, wherein the fluid supply container comprises a shape substantially complementary to a shape of the recess.

11. The beverage brewing device of claim 1, wherein the beverage brewing device does not comprise a fill-port on a top side of the brewing device.

12. The beverage brewing device of claim 1, wherein the fluid supply container comprises a bottle for bottled water, and wherein the inlet comprises a nozzle configured to mate with a nozzle of the bottle.

13. The beverage brewing device of claim 1, comprising a fluid pump configured to generate fluid flow from a water source to a water heater of the beverage brewing device.

14. The beverage brewing device of claim 1, comprising a pressure sensor configured to detect a fluid level in a reservoir of the beverage brewing device.

15. A beverage brewing system, comprising:
- an aircraft rack-mount comprising one or more modular slots configured for securing one or more modular devices; and
- a modular brewing device configured to fit within the aircraft rack-mount, wherein the modular brewing device comprises:
- a housing configured to be secured within the aircraft rack-mount, wherein a front side of the housing is substantially accessible by a user when the housing is secured within the aircraft rack-mount; and
- a fill-port located on the front side of the housing, wherein the fill-port is substantially accessible when the housing is secured within the one or more modular slots, and wherein the fill-port comprises an inlet configured to accept a fluid supply container;
- wherein the aircraft rack-mount has a top-rack portion that blocks access a top face of the housing.

16. The system of claim 15, further comprising the fluid supply container.

17. The system of claim 15, wherein the fill-port comprises a nozzle.

18. The system of claim 17, wherein the nozzle is complementary to a nozzle of the fluid supply container.

19. The system of claim 15, wherein the fill-port comprises an engagement feature configured to engage a complementary engagement feature of the fluid supply container.

20. The system of claim 19, wherein the engagement feature comprises a thread or a detent feature.

21. The system of claim 19, wherein the engagement feature includes a protrusion configured to puncture a portion of the fluid supply container.

22. The beverage brewing device of claim 15, wherein the fill-port is located in a recess of the front side.

23. The beverage brewing device of claim 22, wherein the recess is configured to house all or substantially all of the fluid supply container.

24. The beverage brewing device of claim 15, wherein the fluid supply container comprises a shape substantially complementary to a shape of the recess.

25. The beverage brewing device of claim 15, wherein the modular beverage brewing device does not comprise a fill-port on a top side of the brewing device.

26. The beverage brewing device of claim 15, wherein the fluid supply container comprises a bottle for bottled water.

* * * * *